Patented June 1, 1948

2,442,476

UNITED STATES PATENT OFFICE 2,442,476

PROSPECTING FOR PETROLEUM DEPOSITS

Millard S. Taggart, Jr., Houston, Tex., assignor, by mesne assignments, to Standard Oil Development Company, Elizabeth, N. J., a corporation of Delaware No Drawing. Application September 10, 1946, Serial No. 696,049

6 Claims. (Cl. 204—1)

The present invention is directed to a method for prospecting earth surfaces to determine the presence of subterranean petroleum deposits.

This application is a continuation-in-part of copending application Serial No. 342,953 filed June 28, 1940, (now abandoned).

It has already been postulated that gaseous hydrocarbons diffuse upwardly from petroleum deposits and permeate the soil all the way to the surface. Investigation has indicated that, in areas where such diffusion occurs, there is a growth of hydrocarbon-consuming bacteria at or near the surface. Since these bacteria are aerobic, it is to be expected that their concentration in the soil will decrease with depths, and that at depths in excess of about 2 feet these bacteria are not very numerous. Methods have been developed for the determination of the presence of these bacteria and of the products resulting from their action on hydrocarbons in the topsoil.

I have now found that the topsoil can be very quickly examined for the presence beneath it of subterranean petroleum deposits by determining the oxidation-reduction characteristics of the soil. By the expression "oxidation-reduction characteristic" is meant a characteristic which is imparted to the soil by reason of there having taken place in the soil a reaction involving both oxidation and reduction. The net effect of this reaction generally gives the soil a predominantly reducing characteristic with respect to soil in which no oxidation-reduction has occurred.

By reason of the correlation of the results of the method of the present invention with the results of examination of soils for bacteria, it may be assumed that the characteristic which is relied upon in the practice of the present invention is connected with the bacterial action. It may not be stated definitely what product of the bacterial action imparts the reducing characteristic to the soil, but it can be assumed that among these products will be unsaturated hydrocarbons and nascent hydrogen.

The most convenient method for determining the oxidation-reduction characteristic of the soil is to determine the oxidation-reduction potential of the soil. This measurement of the soil may be made in situ without the removal of any soil from the surface or it may be made on location by scooping out a sample of the soil, or samples may be taken and brought to the laboratory. In any case, the potential is measured by the conventional method in which the medium to be examined is made a part of a half cell which is connected to a recording device in opposition to another half cell, the latter being a standard half cell such as the calomel half cell. Other standard half cells are known, such as the silver-silver chloride half cell, but the calomel cell is the most commonly used. In making up a half cell with the soil, the soil can be lixiviated with water and a platinum electrode immersed in it, this constituting a half cell.

Another way to determine the oxidation-reduction characteristic of the soil is to measure its effect on the potential of an oxidation-reduction system. Such a system can be readily constituted by immersing a metal in a solution of one of its salts. To determine the effect of the soil on this system, the soil is merely mixed with the electrolyte and the metal is connected to a potentiometer in opposition to a standard half cell, which may be identical with said oxidation-reduction system before the soil is mixed therewith. Of course, any standard half cell can be used for reference and readings made of the difference in potential between it and the oxidation-reduction system before and after the soil is mixed with the latter. In the oxidation-reduction system it is preferred to use a metal which is lower than hydrogen in the electromotive series. As an illustration, the soil may be mixed with a solution of copper sulfate in which is immersed a copper electrode.

It will be readily apparent that in the practice of this method, the half cells which are made up with the soil samples must be uniform with respect to the amount of electrolyte used in the half cell and concentration of that electrolyte. For this reason, the practice of a method by examining the soil in situ is greatly limited, since this procedure would be applicable only in soils, such as gumbo, which are relatively impermeable to water.

When the method is used on location, the operator carries merely the standard half cell, the recording instrument, such as a sensitive potentiometer, a container for the soil, a supply of electrolyte of selected concentration, and the electrode which is to be used in the soil half cell.

When the effect of the soil on a copper sulfate half cell is to be measured, a supply of copper sulfate of suitable concentration is carried along by the operator. For the practice of this method, it is desirable to use very dilute solutions of the electrolyte. With an increase in the concentration of the electrolyte in the half cell, the effect of soil constituents becomes smaller on a percentage basis. A suitable concentration of copper sulfate solution for use in the practice of the present invention is a 0.1% solution.

In a field operation according to the present invention, the operator provided with the equipment outlined above proceeds over the area to be prospected, stopping at selected points and scooping up a sample of surface soil. It is, of course, necessary that the operator use the same amount of soil at each location, and also that the sample of soil be taken at the same depth, as nearly as may be. The sample of soil is mixed with the electrolyte in a suitable container and the electrode of that half cell is immersed in the mixture and the meter is read. The value of interest is, of course, the difference between the meter readings before and after mixing the soil with the electrolyte, since the purpose of the operation is to determine the effect of the soil on the potential of the system. This operation is repeated at all of the points selected, which may be suitably spaced about a tenth of a mile apart, and the values obtained are correlated on a map of the locations at which the samples were taken. Abnormally high values are taken as indications of the existence of subterranean petroleum.

As will be apparent from the above discussion, the method of the present invention offers considerable advantages over those hitherto suggested, both with respect to ease of operation and speed of operation. The equipment required for the practice of the method is so simple that the method lends itself more readily to field practice than previous methods which have been suggested.

The nature and objects of the present invention having been thus described and illustrated, what is claimed as being new and useful and is desired to be secured by Letters Patent is:

1. A method for surface prospecting for subterranean petroleum deposits which comprises collecting samples of soil at spaced points over an area to be explored, said samples being collected at uniform depth, mixing the same quantity of each sample with the same quantity of an electrolyte, forming a half cell by inserting a suitable electrode into said mixture, comparing the potential of each of the half cells so formed with the potential of a standard half cell and correlating the results with sample locations to establish a relationship useful in the detection of subterranean petroleum.

2. A method according to claim 4 in which the electrolyte used with the soil is an aqueous solution of a salt of a metal occurring below hydrogen in the electromotive series and the electrode used is made of said metal.

3. A method for surface prospecting for subterranean petroleum deposits which comprises collecting samples of surface soil at spaced points over an area to be explored, determining the effect of each sample on the potential of an oxidation-reduction system having a characteristic potential, and correlating said determinations with sample locations to establish a relationship useful in the detection of subterranean petroleum.

4. A method for surface prospecting for subterranean petroleum deposits which comprises collecting samples of surface soil at spaced points over an area to be explored, adding the same quantity of each sample to the same quantity of an aqueous solution of a metal salt in which is immersed an electrode of said metal, comparing the potential of each of the resulting mixtures with the potential of a reference half cell, and correlating the results with sample locations to establish a relationship useful in the detection of subterranean petroleum.

5. A method according to claim 4 in which the metal salt is copper sulfate and the electrode is copper.

6. A method for surface prospecting for subterranean petroleum deposits which comprises collecting samples of soil at spaced points over an area to be explored, said samples being collected at uniform depth and being of a uniform size, mixing each sample with water, forming a half cell by inserting a platinum electrode into said mixture, comparing the potential of the half cell so formed with the potential of a standard half cell and correlating the results with sample locations to establish a relationship useful in the detection of subterranean petroleum.

MILLARD S. TAGGART, JR.

REFERENCES CITED

The following references are of record in the file of this patent:

UNITED STATES PATENTS

| Number | Name | Date |
|---|---|---|
| 2,278,929 | Horvitz | Apr. 7, 1942 |
| 2,387,513 | Hocott | Oct. 23, 1945 |

OTHER REFERENCES

"Oil and Gas Journal," vol. 37 (Mar. 16, 1939), pages 23, 24.

"Chemical Abstracts," vol. 29 (1935), page 8198. Abstract of article entitled "Catalytic effects of Pt and Au in soil suspensions."

"Soil Science," vol. 37 (1934), pages 65 through 76; publication by Brown, entitled "Oxidation-Reduction Potentials In Soils."